A. T. STUART.
ELECTROLYTIC CELL AND ELECTRODE THEREFOR.
APPLICATION FILED AUG. 27, 1918.
1,303,519.
Patented May 13, 1919.
2 SHEETS—SHEET 1.
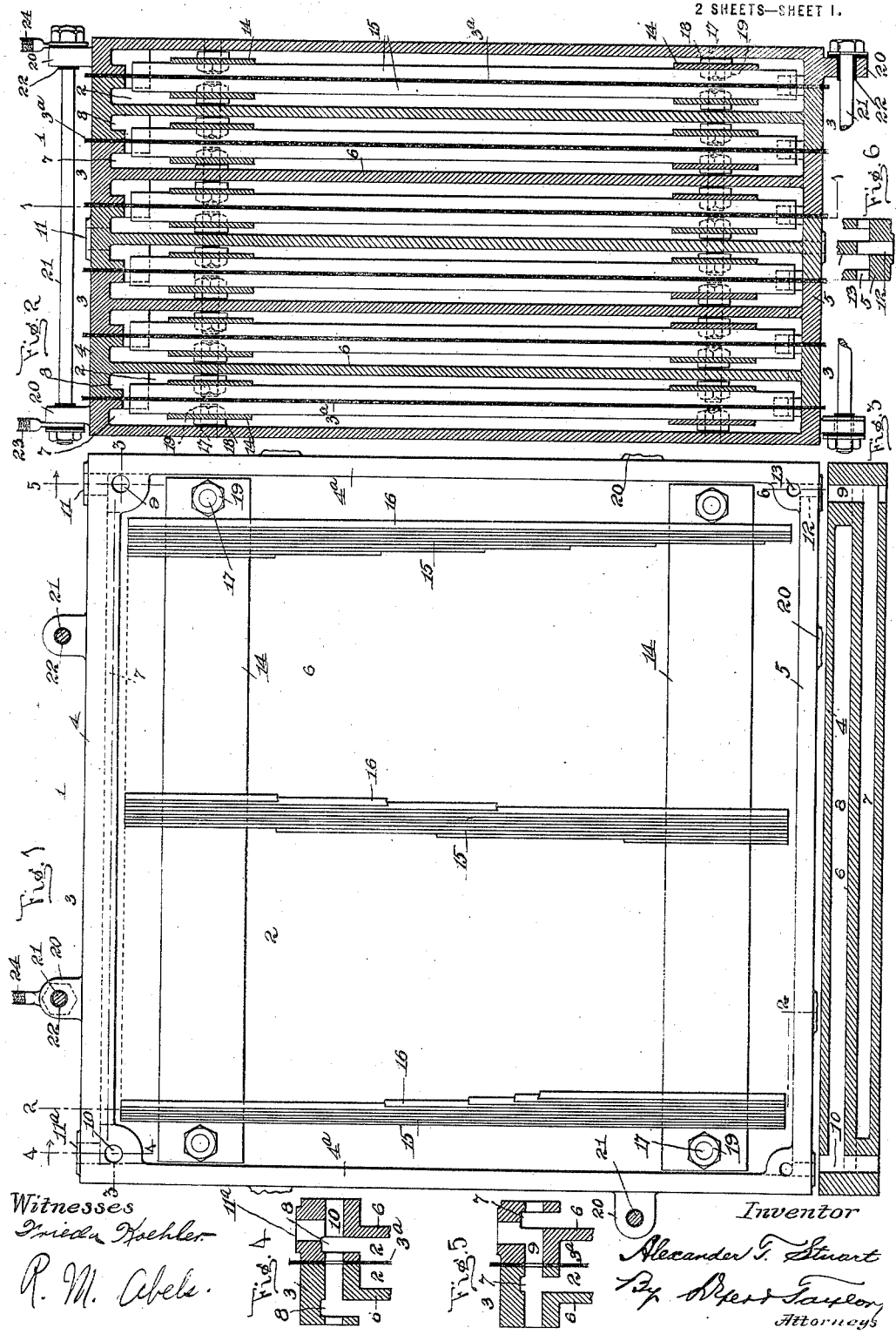

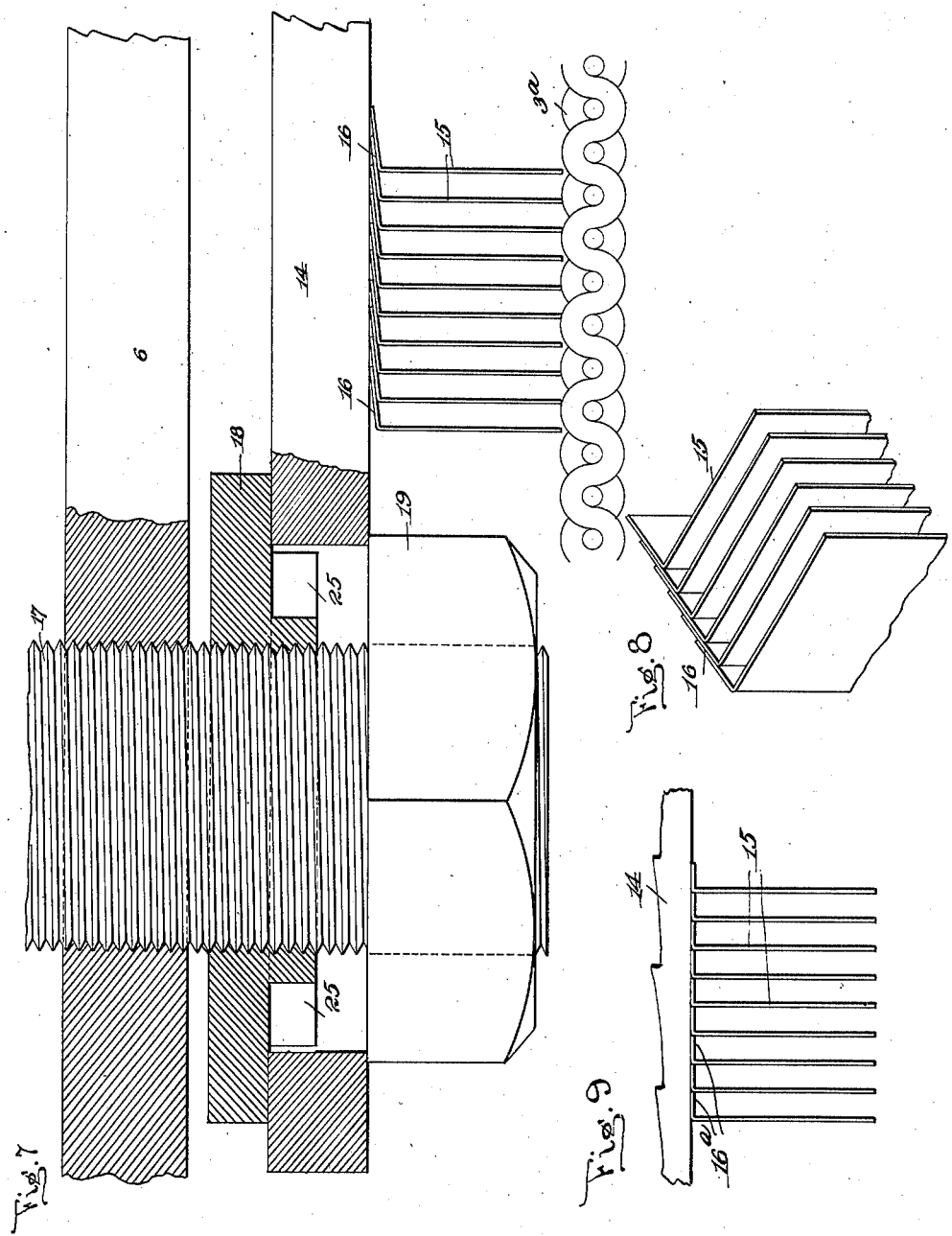

UNITED STATES PATENT OFFICE.

ALEXANDER THOMAS STUART, OF NEW YORK, N. Y., ASSIGNOR TO ROBERT BLEI, TRUSTEE, OF NEW YORK, N. Y.

ELECTROLYTIC CELL AND ELECTRODE THEREFOR.

1,303,519.      Specification of Letters Patent.      Patented May 13, 1919.

Application filed August 27, 1918. Serial No. 251,624.

*To all whom it may concern:*

Be it known that I, ALEXANDER THOMAS STUART, a subject of the King of Great Britain, and a resident of the borough of Manhattan, city, county, and State of New York, have invented a certain new and useful Electrolytic Cell and Electrode Therefor, of which the following is a specification.

The invention relates to electrolytic cells for use primarily in the electrolysis of water whereby the latter is decomposed and separated into its component gases, oxygen and hydrogen.

The ideal cell for this purpose would consist of a flat anode and a flat cathode placed in a bath of acidulated or alkalinized water with their surfaces as close together as possible. This situation would however, make it impossible to separate the gases after the dissociation of the water, and the exit for the gases would be so restricted that the current would cease to bridge the gap between the plates and the circuit would be broken.

If a porous diaphragm were placed between the plates to separate the gases there would be no exit for the gases and hence the current would cease to flow. To allow for the escape of the gases the plates must be moved away from the diaphragm and when this is done the effect is to introduce considerable internal resistance and so reduce the economy of operation.

The objects of the invention are to provide an electrode which may be employed in electrolytic rectifiers, storage batteries, and for other purposes, whereby a large area of reacting surface is produced and in which polarization and internal resistance are reduced to a minimum, and to effect the production of oxygen and hydrogen gases in larger quantities, rapidly and at a minimum of cost.

Further objects are to produce an electrode which will be rigid in character, economical of manufacture and which will present the greatest possible area of reacting surface, while at the same time providing for the rapid removal of the gases, which will shorten the current conducting path, and prevent displacement of the electrolyte by the gas.

These and further objects will more fully appear in the following specification and accompanying drawings, considered together or separately.

The invention is illustrated in the accompanying drawings in which like parts in all of the figures are designated by similar characters of reference, and in which, Figure 1 is a transverse section of a cell embodying the invention, the section being indicated by the line 1—1 on Fig. 2;

Fig. 2 is a longitudinal section of the same taken on the line 2—2 of Fig. 1;

Fig. 3 is a horizontal section on the line 3—3 of Fig. 1;

Fig. 4 is a detail section taken on the line 4—4 of Fig. 1;

Fig. 5 is a detail section taken on the line 5—5 of Fig. 1;

Fig. 6 is a detail section taken on the line 6—6 of Fig. 1;

Fig. 7 is a greatly enlarged plan view, partly in section, of a portion of a cell;

Fig. 8 is a detail perspective view of a portion of the current conducting area; and Fig. 9 is a detail plan view of a modification.

In the practice of the invention a unit or group 1, comprising a plurality of cells 2, is preferably employed. Any number of units electrically connected in series may be employed, and any number of cells may be used in each unit.

Each cell comprises two metallic members 3, electrically insulated from each other by a porous diaphragm $3^a$. Each member 3 consists of a rectangular web or plate 6 having an overhanging flange 4 at the top, a flange $4^a$ at each side, and a flange 5 at the bottom.

The flange 4 at one side of the web 6 is provided with a groove 7, which extends from near one side of the space inclosed by the flanges and communicates near one corner of the member 3 with a passage 9, which extends entirely through the member. On the opposite side of the web a similar groove 8 extends from near the passage 9 to a similar passage 10 through the opposite upper corner of the member.

When the members 3 are assembled side-by-side, as shown in Fig. 2, the passages 9 will form a continuous opening across the unit and this opening will, by means of the grooves 7, be in communication with the space inclosed by one side of all of the webs 6 and one side of all of the diaphragms 3ª, while the passage 10 will form a continuous opening in communication with the spaces at the opposite sides of all of the webs 6.

At the bottom corner of each member 6 is an opening 12, each of which communicates with the space at both sides of the web, 6, and these openings 12 are in alinement and extend through all of the members and offer communication between all of the cells. It will be understood that the openings 9, 10 and 12 do not extend entirely through the end members of the groups, but only so far into such members as to offer communication between the spaces in such members and the corresponding spaces in the adjoining members. The diaphragms 3ª are perforated in line with the passages 9, 10 and 11.

One member 3 of each group, preferably the center member, is provided at the top thereof with two openings 11 and 11ª, one near each end thereof. The opening 11 is an outlet for all of the passages 9, and the opening 11ª is an outlet for all of the passages 10. The bottom of the same member is provided near each end thereof with an opening 13, which, by reason of the openings 12 in the webs 6 and flange 5 become inlets to all of the cells.

The end member 3 of each group 1 is provided with a plurality, preferably two, perforated lugs 20. Bolts 21 passing through the lugs enable the members to be clamped together with a diaphragm between adjoining members. The bolts are carefully insulated from the lugs, as shown at 22. To one end of one bolt 20 is attached an electrical connection 23, which is insulated from the bolt but in contact with the lug, and the opposite end of another bolt carries a connection 24 suitably connected.

Each of the cells 2 formed between the webs of the members 3 and the diaphragm 3ª, asbestos cloth, is provided with an electrode in electrical contact with its continuous web, and in mechanical contact with the diaphragm.

Each electrode comprises a plurality of extremely thin blades 15 of the desired conductive material, arranged side by side and uniformly spaced apart. The length of the blades is considerably greater than their width, and the blades are so arranged that the length is vertical with the spaces between them uniform for the entire length of the blades. A flange 16 is formed along one longitudinal edge of each blade, and this flange is preferably at such an angle to the body of the blades that when the latter are assembled with the desired spaces between them the flanges will overlap and are of such a length that the flange of each blade, except the outermost blades, will rest between the flanges of the two adjoining blades.

The flanges 16 may be secured together by welding, and form a strong rigid back for the electrode, which will give stability to the structure and retain the blades in proper relation to each other and to their coacting elements. To the back formed by the flanges and to the side opposite the blades are secured by welding or otherwise, two fastening bars 14, one adjacent each end of the bladed structure. The bars 14 extend transversely of the longitudinal length of the blades, and are of a length sufficient to extend beyond the sides of the back formed by the flanges.

Each bar 14 is provided near each end with a perforation which engages over screw-threaded pins 17 secured in the webs 6 of the members 3. The pins 17 may extend the same distance beyond each side of the web and each pin may engage a bar on each side of said web. An adjusting nut 18 is placed upon each pin before the bars carrying the blades are positioned. Each nut is provided with a reduced portion which engages the opening in the bar and has a series of oppositely disposed notches 25 for the engagement of a spanner wrench whereby the electrodes may be adjusted until the edges of the blades are brought to a proper level relatively to the faces of the flanges 4, 4ª, and 5. A lock nut 19 is then applied to each pin and the electrodes are securely fastened in position. The electrodes are readily detachable and may be easily removed and replaced when desired.

The pins 17 may be welded or otherwise secured in the webs to prevent rotation with the nuts, and to avoid leakage through the webs or partitions.

The diaphragm 3ª is of di-electric material, and is more or less flexible and expansible. When the device is assembled the free longitudinal edges of the electrode blades are in intimate contact with the diaphragm and engage it on both sides, the engaging edges of one electrode being opposite those of the electrode on the other side of the diaphragm, whereby the later is supported by the blades and the gap between the edges of the blades is the thickness of the diaphragm only.

The blading of the electrodes is preferably of sheet iron, and is as thin as it is practicable to roll such material. Excellent results have been obtained with blades of a thickness of .003,965 inch, or 38 American gage, spaced apart the thickness of a strip of 16 American gage or .05,082 inch. With blades of the thickness given the depth from back to front may be about .25 inch, and the lines of force will be extremely active and will utilize the entire area presented by the blades.

One electrode, the anode, in each cell 2, is preferably nickel-plated, while the other electrode, the cathode, in the same cell, is of black iron.

The operation is as follows:

The cells are filled with water which has been alkalinized by sodium-hydroxid, potassium hydroxid, or properly acidulated to reduce the internal resistance. This water is admitted into all of the cells through the openings 13. The water will seep through diaphragms and preserve the balance in all of the cells.

A direct current of the proper voltage is now directed through the cable 23, and after passing through the cells will be taken off by the connection 24. As the current passes through the electrolyte between the electrodes their polarity will be fixed, and as the hydrogen is electro-positive it will be attracted to and liberated on the negative electrode or cathode, while the oxygen, being electro-negative, will be attracted to and liberated on the positive electrode or anode. As the anode and cathode of each cell are separated by the diaphragm, which is impervious to the gases, the oxygen will rise between the blades on the anode side and escape through the grooves 7, passages 9 and openings 11. The hydrogen will rise between the blades of the cathode and be withdrawn through the grooves 8, passages 10 and outlet 11ª.

The gases and such of the water as is entrained with them are directed to tanks where the water is separated from the gas and re-used and the gases are deposited in suitable holders whence they may be compressed and bottled for shipment.

It is important that the blades of the electrodes be as thin as it is possible to form the metal of which they are composed, and to restrict the width of the spaces between them to the least dimension capable of permitting the formation of gas bubbles on the blades and the travel of the bubbles through the spaces. The thickness, 38 gage, given above, is cited as an example, and is the thinnest sheet iron which applicant was able to purchase in the open market. Plates much thinner than 38 gage may be employed and the spaces between them correspondingly reduced. Foil or leaf metal of the proper rigidity may be used and even ordinary foils, if properly supported, may be employed and will present a much greater area of reacting surface.

It will be understood that the electrodes of each cell need not be arranged with the blades of the anode opposite those of the cathode, but said blades may be staggered with the positive blades opposite the spaces of the negative blades.

In the modification illustrated in Fig. 9 the flanges 16ª of the blades 15 are bent up to an angle of 90 degrees, and are of the same length as the width of the spaces between the blades. The blading is arranged with the edge of one flange 16ª engaging the adjoining blade and the flanges and blades are properly secured together and to the bars 14.

In some forms of cells, where separation of gases is not necessary, such, for example, as those used in electrolytic refining or deposition of metal, the diaphragm may be omitted and the edges of the blades brought as close together as possible without actual contact.

If desired the blades may be held in spaced relation by any approved mechanism inserted between the back and the edges in contact with the diaphragm.

For the purpose of giving greater strength and rigidity to the back the flanges 16 may be secured together for any portion, or for the entire length of the blades.

Claims:

1. An electrode comprising a rigid back, and a plurality of members rigidly supported by said back, each member engaging the back for the entire length of the back, there being spaces between the members.

2. An electrode comprising a rigid back, and a plurality of thin blades arranged at an angle to the back and spaced one from another, said blades engaging the back for a considerable portion of the length of the blades.

3. An electrode comprising a rigid back, and a plurality of thin blades arranged at an angle to the back and spaced one from another, said blades engaging the back for the full length of the blades, the said spaces being of the same width for the entire length of the blades.

4. An electrode comprising a rigid back, a plurality of equally spaced, thin blades secured to said back and extending at an angle therefrom, said back forming a closure for the spaces at one side of the entire length of the blades.

5. An electrode comprising a multiplicity of thin blades, there being spaces between the blades, said blades being of considerable length as compared with their width and thickness, a rigid backing to which one longitudinal edge of each blade is secured, said backing forming a closure for the spaces along that face of the electrode.

6. An electrode having a reacting surface comprising a multiplicity of blades of a minimum thickness, said blades being equally spaced apart, said blades of considerable length as compared with their width and thickness, said spaces extending the entire length of the blades and being of the same width throughout, a rigid backing for the blades, said backing inclosing the spaces at one face of the electrode for the entire length of the blade, and a support secured to the backing.

7. An electrode having a reacting surface comprising a multiplicity of blades, of a minimum thickness, said blades being equally spaced apart, said blades of considerable length as compared with their width and thickness, said spaces extending the entire length of the blades and being of the same width throughout, a rigid backing for the blades, said backing inclosing the spaces at one face of the electrode for the entire length of the blade, and a support secured to the backing near the ends of the blades.

8. An electrode comprising a plurality of members arranged in a common plane and spaced apart, there being a portion of each member in contact with a contiguous member.

9. An electrode comprising a plurality of members arranged in a common plane and spaced apart, there being a portion of each member in contact with a contiguous member for the entire length of said members.

10. An electrode comprising a plurality of members arranged in a common plane and spaced apart, there being a portion of each member in contact with a contiguous member, and means for securing the members together.

11. An electrode comprising a plurality of thin blades equally spaced apart and arranged with their edges in a common plane, a flange along one longitudinal edge of each blade, said flange engaging the next adjacent blade and bridging the space at that edge of the blade.

12. An electrode comprising a plurality of thin blades equally spaced apart and arranged with their edges in a common plane, a flange along one longitudinal edge of each blade, said flange engaging the next adjacent blade and bridging the space at that edge of the blade, and means for securing the flange of one blade to the said next adjacent blade.

13. An electrode comprising a plurality of thin metallic blades spaced one from another to form a rectangular structure, one face of such structure being composed of the free longitudinal edges of all of the plates, the opposite longitudinal edge of each plate having a flange thereon and arranged at an obtuse angle to the blade, the flange of one blade overlapping the flange of the next adjacent blade to form a rigid back for the electrode, and means for securing the flanges together.

14. An electrolytic cell comprising a pair of metallic members secured together to form narrow chambers between them, a diaphragm of porous, dielectric material between the members to divide the chamber, an electrode on each side of the diaphragm, each electrode comprising a multiplicity of thin blades of conducting material in vertical arrangement, there being spaces between the blades, said spaces being of equal width throughout their lengths, the longitudinal edges of the blade of the electrodes engaging the diaphragm on opposite sides thereof, means for introducing an electrolyte containing water into the chamber from the bottom thereof and on each side of the diaphragm, said electrolyte permeating said diaphragm, means for passing an electric current from one electrode to the other through the electrolyte in the diaphragm, whereby the water will be decomposed, the hydrogen will be liberated on the cathode side of the diaphragm and the oxygen will be liberated on the anode, and means for withdrawing the gases.

15. An apparatus for decomposing water by electrolysis, comprising a series of narrow cells arranged side-by-side, a diaphragm of porous, di-electric material in each cell dividing it into equal parts, an electrode on each side of each diaphragm, said electrodes each comprising a multiplicity of extremely thin blades of conducting material in vertical arrangement, there being narrow spaces between the blades, said spaces being of the same width for the entire length of the blades, the longitudinal edges of the blades of each electrode engaging the diaphragm, the opposite edges of the blades of each electrode being secured to a rigid back, means for adjustably supporting the electrodes on the walls separating the cell alined openings in the walls of the cells at the bottoms thereof, common means for introducing an electrolyte containing water into all of the cells, said electrolyte permeating the diaphragms, means for passing an electric current through the series of cells from end-to-end, whereby the polarity of the current will be changed in its passage through the electrolyte between the opposed electrodes and the water will be decomposed, the hydrogen being liberated on the cathode electrode and the oxygen liberated on the anode electrode, a passage on the positive side of each partition for collecting the oxygen of each cell, a conduit connecting the said passages of all of the partitions, an oxygen outlet common to all of the passages, a passage on the negative side of each partition for collecting the hydrogen of each cell, a conduit connecting said passages of all of the negative sides of the series, and a hydrogen outlet common to all of the said passages.

This specification signed and witnessed this ninth day of August, 1918.

ALEXANDER THOMAS STUART

Witnesses:
J. M. SABLAF,
KATHRYN M. FLANDERS.